US012468668B2

(12) United States Patent
Maharaja et al.

(10) Patent No.: US 12,468,668 B2
(45) Date of Patent: *Nov. 11, 2025

(54) SYSTEM FOR INTELLIGENT DATABASE MODELLING

(71) Applicant: BANK OF AMERICA CORPORATION, Charlotte, NC (US)

(72) Inventors: Raja Arumugam Maharaja, Tamil Nadu (IN); Ankit Singh Negi, Gurugram (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/408,659

(22) Filed: Jan. 10, 2024

(65) Prior Publication Data

US 2025/0028690 A1 Jan. 23, 2025

Related U.S. Application Data

(63) Continuation of application No. 17/482,779, filed on Sep. 23, 2021, now Pat. No. 11,907,179.

(51) Int. Cl.
*G06F 16/21* (2019.01)
*G06F 8/61* (2018.01)
(Continued)

(52) U.S. Cl.
CPC ............... *G06F 16/21* (2019.01); *G06F 8/61* (2013.01); *G06N 20/00* (2019.01); *G06T 11/00* (2013.01);
(Continued)

(58) Field of Classification Search
CPC .......... G06F 16/21; G06F 8/61; G06F 16/288; G06F 18/2148; G06F 16/212;
(Continued)

(56) References Cited

U.S. PATENT DOCUMENTS 5,970,490 A 10/1999 Morgenstern
6,044,374 A 3/2000 Nesamoney et al.
(Continued)

FOREIGN PATENT DOCUMENTS

WO 2017098519 A1 6/2017

*Primary Examiner* — Evan Aspinwall
(74) *Attorney, Agent, or Firm* — Moore & Van Allen PLLC; Anup Iyer

(57) ABSTRACT

Systems, computer program products, and methods are described herein for intelligent database modelling. The present invention is configured to capture, using the augmented reality application, a drawing made by the user on a medium; initiate a first machine learning model on the drawing; determine that the user is attempting to design a database model; extract at least a first entity from the drawing; determine, using the first machine learning model, one or more attributes for the first entity; initiate, via the augmented reality application, a first push notification for display on the computing device of the user; electronically receive, via the augmented reality application, a user selection of a subset of attributes from the one or more attributes; generate, using the augmented reality application, a conceptual database model based on at least the first entity and the subset of attributes.

14 Claims, 6 Drawing Sheets

(51) Int. Cl.
*G06N 20/00* (2019.01)
*G06T 11/00* (2006.01)
*G06V 30/18* (2022.01)
*G06V 30/422* (2022.01)

(52) U.S. Cl.
CPC ............ *G06V 30/18* (2022.01); *G06V 30/422* (2022.01); *G06T 2200/24* (2013.01)

(58) Field of Classification Search
CPC ...... G06F 40/295; G06F 40/258; G06F 30/27; G06F 16/284; G06N 20/00; G06N 5/02; G06N 5/022; G06V 30/422; G06V 30/18; G06T 11/00; G06T 2200/24; G06Q 10/067
USPC .................................................. 707/802, 999
See application file for complete search history.

(56) References Cited

U.S. PATENT DOCUMENTS

| | | | |
|---|---|---|---|
| 6,161,139 A | 12/2000 | Win et al. | |
| 6,535,868 B1 | 3/2003 | Galeazzi et al. | |
| 6,697,808 B1 | 2/2004 | Hurwood et al. | |
| 6,957,225 B1 | 10/2005 | Zait et al. | |
| 7,013,310 B2 | 3/2006 | Messing et al. | |
| 7,373,350 B1 | 5/2008 | Arone et al. | |
| 7,389,314 B2 | 6/2008 | Kulkarni et al. | |
| 7,554,542 B1 | 6/2009 | Ferraro et al. | |
| 7,634,515 B2 | 12/2009 | Hunter et al. | |
| 7,647,293 B2 | 1/2010 | Brown et al. | |
| 7,702,636 B1 | 4/2010 | Sholtis et al. | |
| 7,774,378 B2 | 8/2010 | Nelson | |
| 7,797,319 B2 | 9/2010 | Piedmonte | |
| 8,180,872 B1 | 5/2012 | Marinelli et al. | |
| 8,364,955 B1 | 1/2013 | Sharma et al. | |
| 10,282,360 B2 | 5/2019 | Krause et al. | |
| 10,552,383 B2 | 2/2020 | Sharma et al. | |
| 10,699,488 B1 | 6/2020 | Terrano | |
| 10,922,493 B1 | 2/2021 | Das | |
| 11,915,377 B1 | 2/2024 | Bhushan | |
| 2004/0243458 A1 | 12/2004 | Barkan | |
| 2005/0071359 A1 | 3/2005 | Elandassery et al. | |
| 2006/0195492 A1 | 8/2006 | Clark et al. | |
| 2006/0248083 A1 | 11/2006 | Sack et al. | |
| 2007/0156792 A1 | 7/2007 | D'Souza et al. | |
| 2007/0174308 A1 | 7/2007 | Rausch | |
| 2007/0214179 A1 | 9/2007 | Hoang | |
| 2007/0282784 A1 | 12/2007 | Modani et al. | |
| 2008/0140696 A1 | 6/2008 | Mathuria | |
| 2008/0222192 A1 | 9/2008 | Hughes | |
| 2009/0083768 A1 | 3/2009 | Hatalkar et al. | |
| 2009/0106242 A1 | 4/2009 | Mcgrew et al. | |
| 2011/0251984 A1* | 10/2011 | Nie | G06F 16/248 706/18 |
| 2012/0237022 A1 | 9/2012 | Berson et al. | |
| 2014/0253590 A1* | 9/2014 | Needham | G06V 30/224 345/633 |
| 2015/0067154 A1 | 3/2015 | Ly et al. | |
| 2016/0275526 A1 | 9/2016 | Becanovic | |
| 2016/0292672 A1 | 10/2016 | Fay et al. | |
| 2016/0300234 A1 | 10/2016 | Moss-Pultz | |
| 2017/0005804 A1 | 1/2017 | Zinder | |
| 2017/0032249 A1* | 2/2017 | Chougule | G06N 5/02 |
| 2017/0041296 A1 | 2/2017 | Darji et al. | |
| 2017/0046651 A1 | 2/2017 | Lin et al. | |
| 2017/0124487 A1 | 5/2017 | Szeto et al. | |
| 2017/0124556 A1 | 5/2017 | Seger, II | |
| 2017/0126702 A1 | 5/2017 | Krishnamurthy | |
| 2017/0169103 A1 | 6/2017 | Juneja et al. | |
| 2017/0236094 A1 | 8/2017 | Shah | |
| 2017/0352027 A1 | 12/2017 | Zhang et al. | |
| 2017/0353309 A1 | 12/2017 | Gray | |
| 2017/0371876 A1* | 12/2017 | Bailey | G06T 15/00 |
| 2018/0005186 A1 | 1/2018 | Hunn | |
| 2018/0025181 A1 | 1/2018 | Barinov et al. | |
| 2018/0227116 A1 | 8/2018 | Chapman et al. | |
| 2018/0253452 A1 | 9/2018 | Callan et al. | |
| 2019/0171975 A1* | 6/2019 | Kurian | G06Q 30/0631 |
| 2019/0236598 A1 | 8/2019 | Padmanabhan | |
| 2019/0325265 A1 | 10/2019 | Lecue | |
| 2020/0066044 A1 | 2/2020 | Stahl | |
| 2020/0082302 A1 | 3/2020 | Zoldi et al. | |
| 2020/0184379 A1 | 6/2020 | Dong et al. | |
| 2020/0293171 A1 | 9/2020 | Draper | |
| 2020/0341951 A1* | 10/2020 | Oberhofer | H04L 9/50 |
| 2020/0401576 A1 | 12/2020 | Yerli | |
| 2021/0019215 A1 | 1/2021 | Neeter | |
| 2021/0133850 A1 | 5/2021 | Ayush | |
| 2021/0224695 A1* | 7/2021 | Stefanov | G06N 20/20 |
| 2021/0390745 A1 | 12/2021 | Rykhliuk | |
| 2022/0269702 A1 | 8/2022 | Portisch et al. | |
| 2023/0004538 A1 | 1/2023 | Kumar | |
| 2023/0018975 A1* | 1/2023 | Sreenivasan | G06F 16/2379 |

* cited by examiner

SYSTEM FOR INTELLIGENT DATABASE MODELLING

CROSS-REFERENCE TO RELATED APPLICATIONS

This application is a continuation application of and claims priority to U.S. patent application Ser. No. 17/482,779 of the same titled and filed on Sep. 23, 2021; the contents of which are also hereby incorporated herein by reference.

FIELD OF THE INVENTION

The present invention embraces a system for intelligent database modelling.

BACKGROUND

Database modelling is the process of producing a diagram of relationships between various types of information that are to be stored in a database to identify key data points to be stored and retrieved, and how they are grouped and related. One of the goals of data modeling is to create the most efficient method of storing information while still providing for complete access and reporting. However, due to increasing data dependency issues in large organizations, creating a database model has become tedious and time consuming.

Therefore there is a need for an intelligent database modelling system to create a database model.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for intelligent database modelling is presented. The system comprising: at least one non-transitory storage device; and at least one processing device coupled to the at least one non-transitory storage device, wherein the at least one processing device is configured to: provide an augmented reality application for installation on a computing device of a user; capture, using the augmented reality application, a drawing made by the user on a medium; initiate a first machine learning model on the drawing; determine, using the first machine learning model, that the user is attempting to design a database model; extract at least a first entity from the drawing based on at least determining that the user is attempting the design the database model; determine, using the first machine learning model, one or more attributes for the first entity; initiate, via the augmented reality application, a first push notification for display on the computing device of the user, wherein the first push notification comprises at least the one or more attributes; electronically receive, via the augmented reality application, a user selection of a subset of attributes from the one or more attributes; and generate, using the augmented reality application, a conceptual database model based on at least the first entity and the subset of attributes.

In some embodiments, the at least one processing device is further configured to: retrieve one or more database models from a data repository; extract one or more entities and one or more attributes from the one or more database models; initiate a machine learning algorithm on one or more database models, and the one or more entities and the one or more attributes; and train, using the machine learning algorithm, the first machine learning model, wherein training further comprises determining one or more classification parameters for the first machine learning model.

In some embodiments, the at least one processing device is further configured to: determine, using the classification parameters, the one or more attributes for the first entity.

In some embodiments, the at least one processing device is further configured to: automatically generate, using the first machine learning model, a relationship between the first entity and the subset of attributes; and record the relationship in the conceptual database model.

In some embodiments, the at least one processing device is further configured to: transmit control signals configured to cause the computing device of the user to display the conceptual database model for user approval; and electronically receive, via the computing device of the user, the user approval for the conceptual database model.

In some embodiments, the at least one processing device is further configured to: determine, using the first machine learning model, one or more database schema based on at least the conceptual database model; initiate, via the augmented reality application, a second push notification for display on the computing device of the user, wherein the second push notification comprises at least the one or more database schema; electronically receive, via the augmented reality application, a user selection of a database schema from the one or more database schema; and in response, generate a physical database model using the database schema.

In some embodiments, the at least one processing device is further configured to: automatically generate an entity relationship diagram (ERD) based on the physical database model illustrating a logical structure of the database model.

In some embodiments, the at least one processing device is further configured to: initiate a second machine learning model on one or more data sources and the physical database model; and determine, using the second machine learning model, at least one data source that is likely to be triggered when populating a database created using the physical database model.

In some embodiments, the at least one processing device is further configured to: generate a new transaction object for the physical database model; and broadcast the new transaction object for the physical database model to the at least one data source in a distributed ledger for validation.

In some embodiments, broadcasting the new transaction object further comprises: receive, from a computing device associated with the at least one data source, an indication validating the physical database model; and authorize a generation of a database using the physical database model based on at least receiving the validation.

In another aspect, a computer program product for intelligent database modelling, the computer program product comprising a non-transitory computer-readable medium comprising code causing a first apparatus to: provide an augmented reality application for installation on a computing device of a user; capture, using the augmented reality application, a drawing made by the user on a medium; initiate a first machine learning model on the drawing; determine, using the first machine learning model, that the user is attempting to design a database model; extract at least a first entity from the drawing based on at least determining that the user is attempting the design the database model; determine, using the first machine learning model, one or more attributes for the first entity; initiate, via the augmented reality application, a first push notification for display on the computing device of the user, wherein the first push notification comprises at least the one or more attributes; electronically receive, via the augmented reality application, a user selection of a subset of attributes from the one or more attributes; and generate, using the augmented reality application, a conceptual database model based on at least the first entity and the subset of attributes.

In yet another aspect, a method for intelligent database modelling is presented. The method comprising: providing an augmented reality application for installation on a computing device of a user; capturing, using the augmented reality application, a drawing made by the user on a medium; initiating a first machine learning model on the drawing; determining, using the first machine learning model, that the user is attempting to design a database model; extracting at least a first entity from the drawing based on at least determining that the user is attempting the design the database model; determining, using the first machine learning model, one or more attributes for the first entity; initiating, via the augmented reality application, a first push notification for display on the computing device of the user, wherein the first push notification comprises at least the one or more attributes; electronically receiving, via the augmented reality application, a user selection of a subset of attributes from the one or more attributes; and generating, using the augmented reality application, a conceptual database model based on at least the first entity and the subset of attributes.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
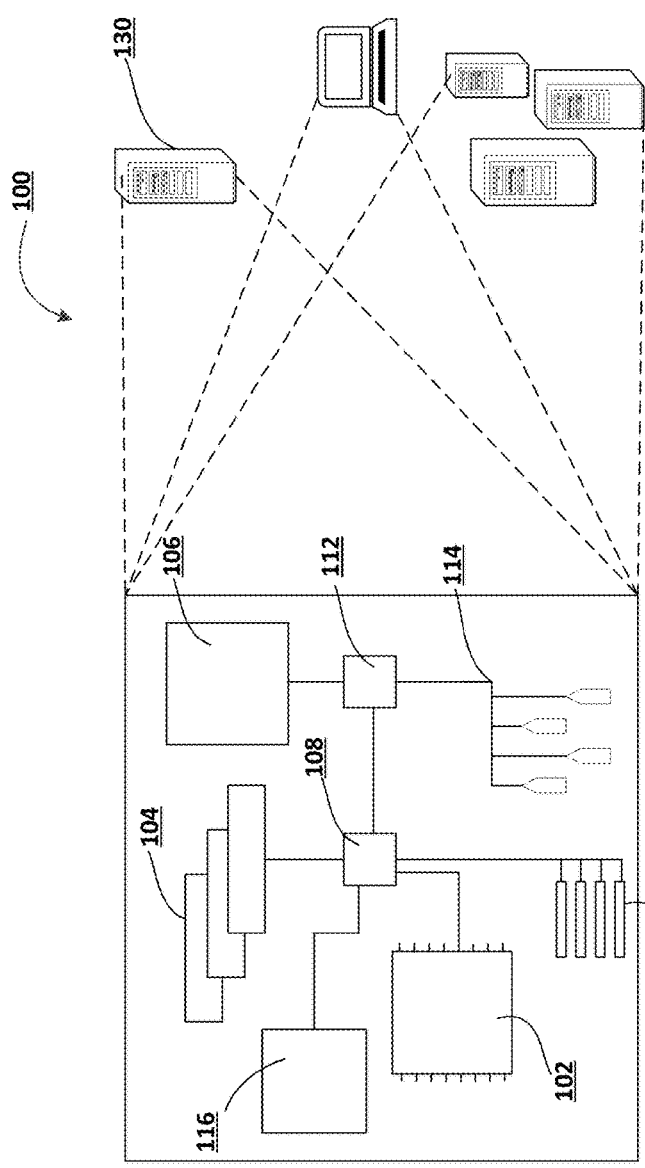
Figure 1:
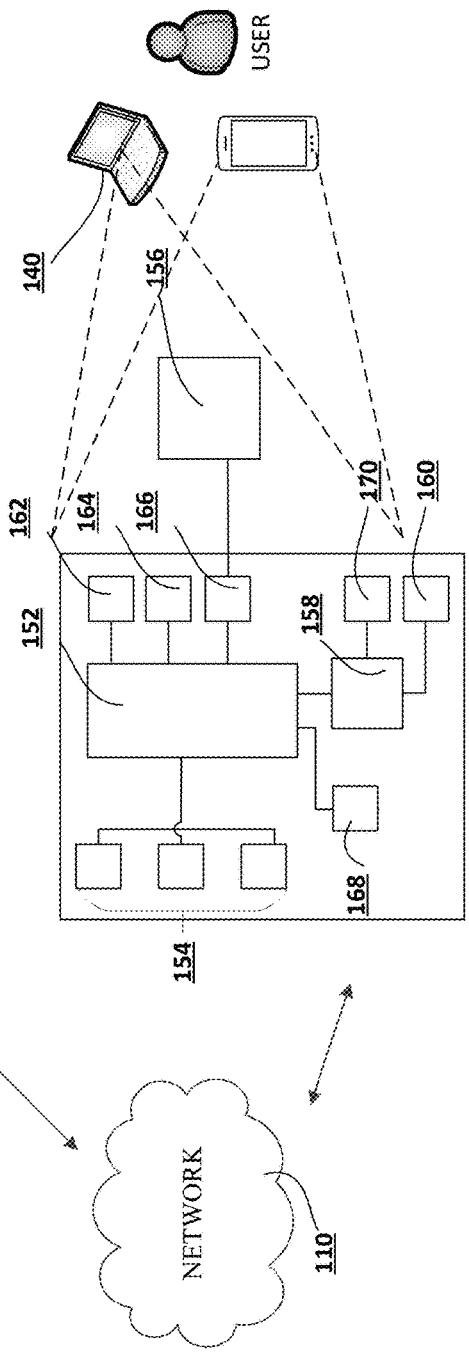
Figure 2:
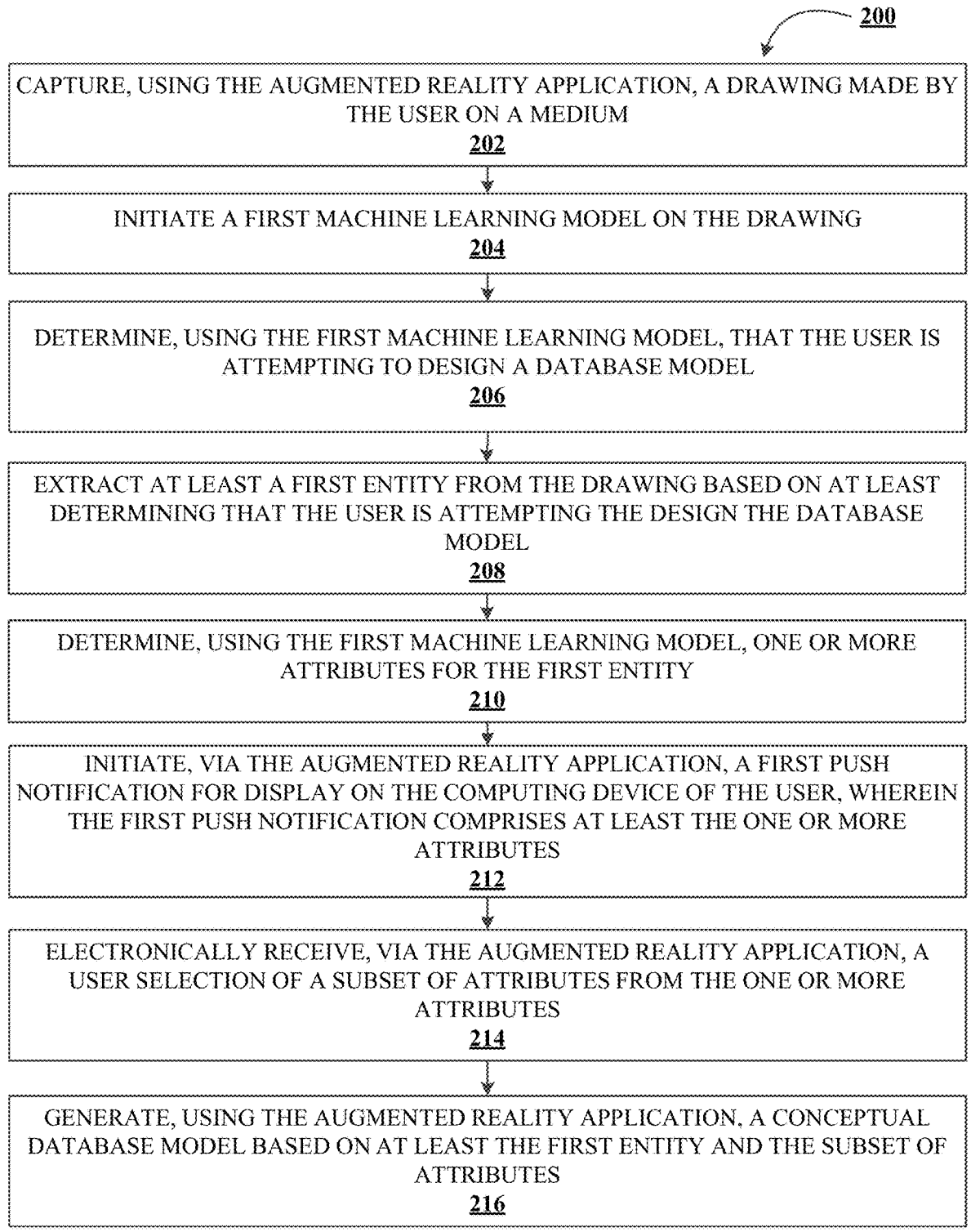
Figure 3:
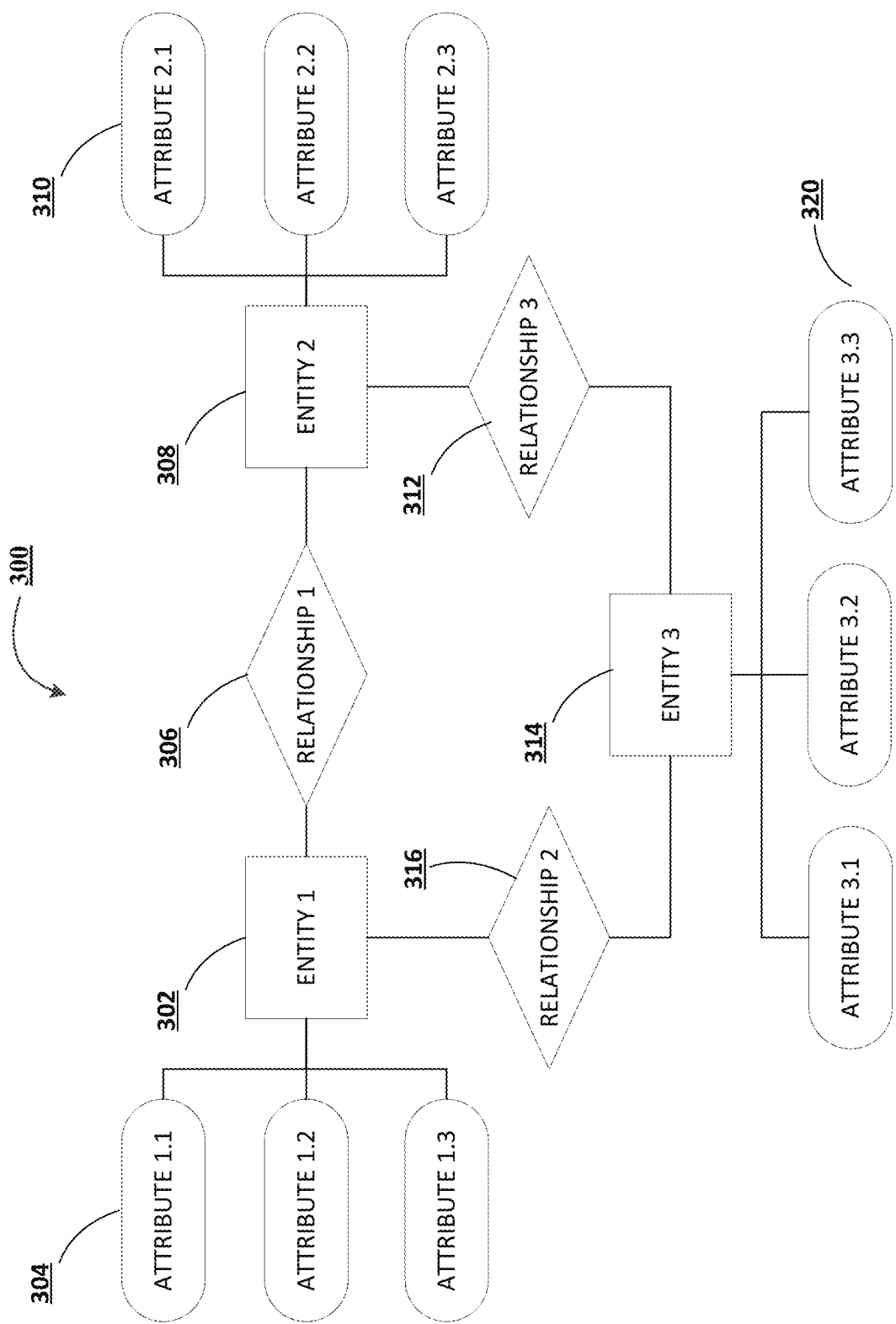
Figure 4:
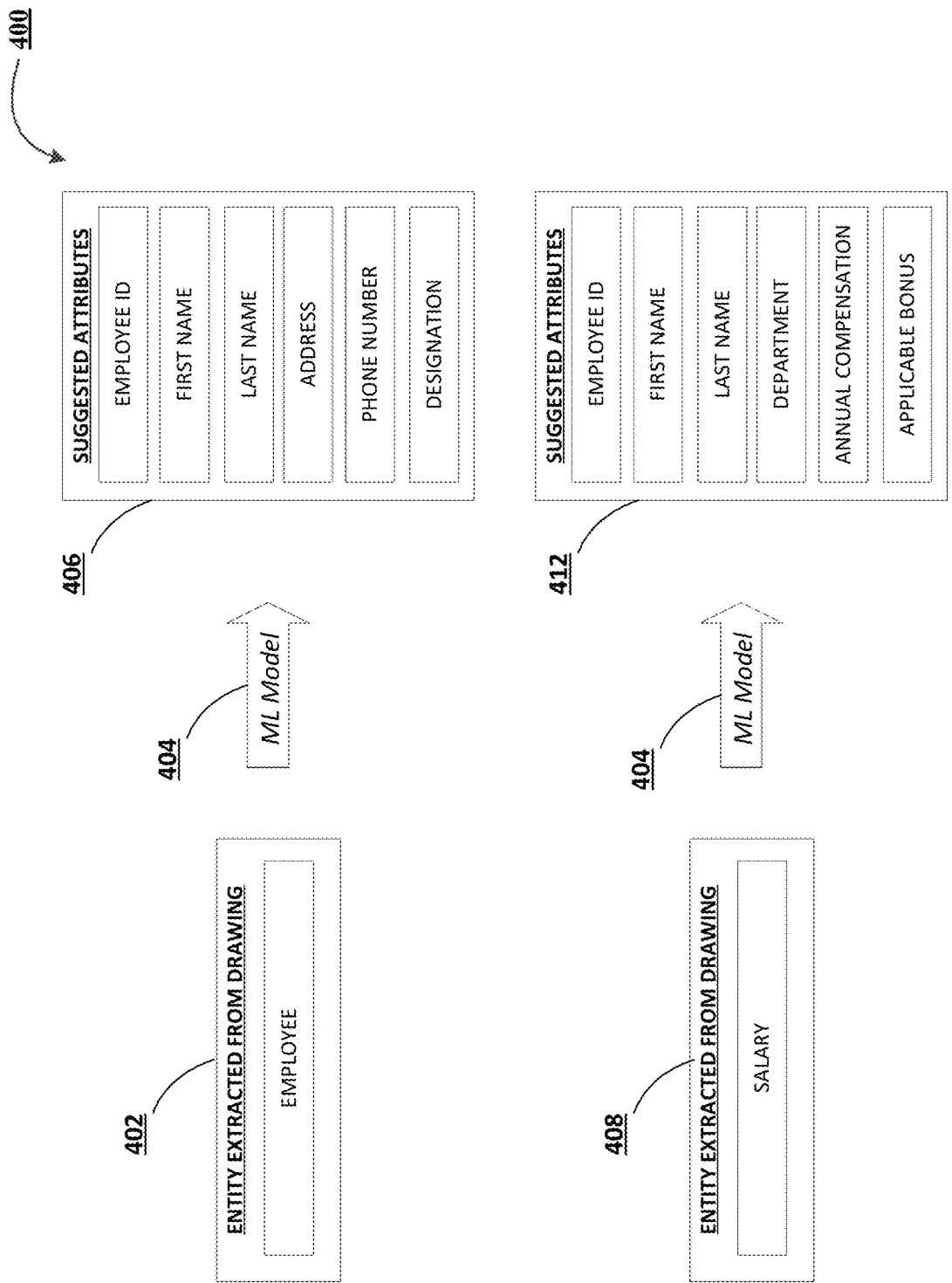
Figure 5:
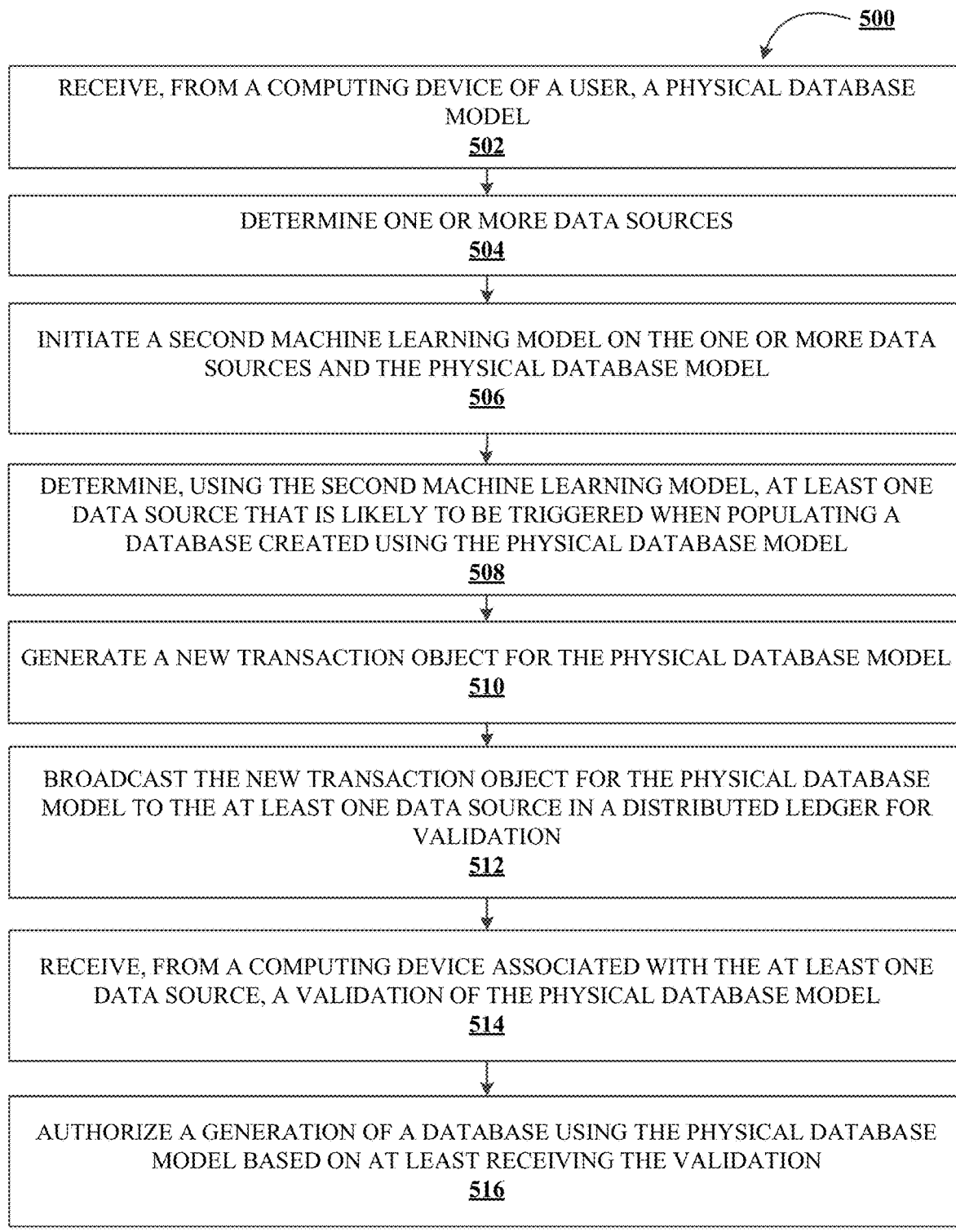
Figure 6:
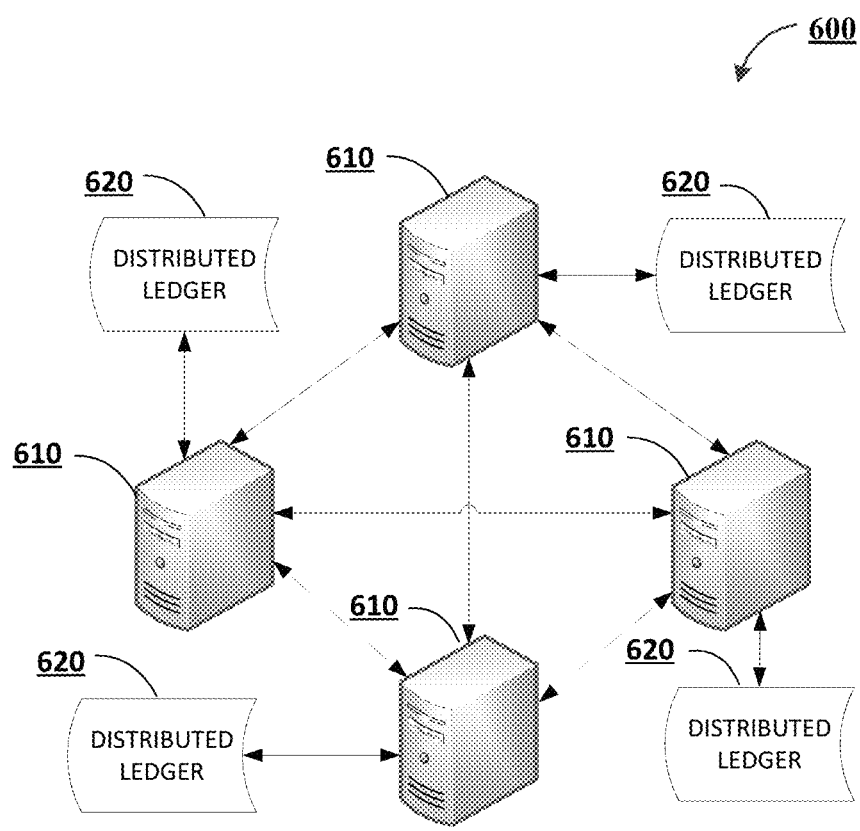

Having thus described embodiments of the invention in general terms, reference will now be made the accompanying drawings, wherein:

FIG. 1 illustrates technical components of a system for intelligent database modelling, in accordance with an embodiment of the invention;

FIG. 2 illustrates a process flow for intelligent database modelling, in accordance with an embodiment of the invention;

FIG. 3 illustrates a conceptual database model generated by the augmented reality application, in accordance with an embodiment of the invention;

FIG. 4 illustrates determination of attributes based on extracted entities using a machine learning model, in accordance with an embodiment of the invention;

FIG. 5 illustrates a process flow for authorizing a database model using distributed ledger technology, in accordance with an embodiment of the invention; and FIG. 6 illustrates a decentralized block chain network configuration, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "organization" may be any institution employing information technology resources and particularly technology infrastructure configured for processing large amounts of data. Typically, these data can be related to the people who work for the organization, its products or services, the customers or any other aspect of the operations of the organization. As such, the organization may be any institution, group, association, financial institution, establishment, company, union, authority or the like, employing information technology resources for processing large amounts of data.

As described herein, a "user" may be an individual associated with an organization. As such, in some embodiments, the user may be an individual having past relationships, current relationships or potential future relationships with an organization. In some embodiments, a "user" may be an employee (e.g., an associate, a project manager, an IT specialist, a manager, an administrator, an internal operations analyst, or the like) of the organization or enterprises affiliated with the organization, capable of operating the systems described herein. In some embodiments, a "user" may be any individual, organization or system who has a relationship with the organization, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an organization. In such embodiments, the organization may employ additional computer systems, such as authentication servers, to validate and certify resources inputted by the plurality of users within the system. The system may further use its authentication servers to certify the identity of users of the system, such that other users may verify the identity of the certified users. In some embodiments, the organization may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more organizations or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making prediction about a dataset. Machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

FIG. 1 presents an exemplary block diagram of the system environment for intelligent database modelling 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. In some embodiments, the system 130, and the user input system 140 may be used to implement the processes described herein, in accordance with an embodiment of the present invention. In this regard, the system 130 and/or the user input system 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, personal digital assistants, servers, wearable devices, Internet-of-things devices, augmented reality (AR) devices, virtual reality (VR) devices, extended reality (XR) devices, mixed reality (MR) devices, electronic kiosk devices, blade servers, mainframes, or any combination of the aforementioned. In accordance with embodiments of the invention, the user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input system 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140 or may also store applications or other information therein. In some embodiments, expansion memory may include instructions to carry out or supplement the processes described above and may include secure information also. For example, expansion memory may be provided as a security module for user input system 140 and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130 via the network 110. Any communication between the system 130 and the user input system 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input system 140 (or any other computing devices) may provide the system 130 with permissioned to access the protected resources of the user input system 130 (or any other computing devices), which may include a GPS device, an image capturing component (e.g., camera), a microphone, a speaker, and/or any of the components described herein.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 130 and the user input system 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input system 140 may have a client-server relationship, where the user input system 130 makes a service request to the system 130, the system 130 accepts the service request, processes the service request, and returns the requested information to the user input system 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some, or all of the portions of the system 130 may be separated into two or more distinct portions.

The system of the present invention leverages an augmented reality platform and machine learning techniques to develop a conceptual model of a database. The user may begin a simple drawing of a database model with some entities/attributes on a medium (e.g., paper). The system uses an augmented reality application to capture the drawing (either in real-time or by uploading the drawing to the application). Once captured, the machine learning model analyzes the drawing made by the user and determines that the user is attempting to build a database model. The system then uses the machine learning model to provide suggestions to the user for related entities/attributes and other sub-attributes that can or should be included. By suggesting entities/attributes, the system helps the user develop a conceptual database model. Once the conceptual model is generated, the system then uses the machine learning model to convert the conceptual model into a logical/physical model by assigning column names, data type, data length, suggesting normalization, schema, etc. The logical/physical model is then represented in the form of an entity-relationship (ER) diagram.

FIG. 2 illustrates a process flow for intelligent database modelling, in accordance with an embodiment of the invention. As shown in block 202, the process flow includes capturing, using the augmented reality application, a drawing made by the user on a medium. To this end, the system may be configured to provide the augmented reality application to the user for installation on the computing device of the user. The drawing may be any text, picture, or diagram made with a writing instrument such as a pen or pencil on a medium such as a piece of paper. The user may begin designing a database model by beginning to draw a database model that shows the logical structure of the database they have in mind. This drawing may be captured by the augmented reality application, which enhances the drawing using computer-generated perceptual information to provide the user a working environment that may be a combination of real and virtual worlds, real-time interaction, and accurate three-dimensional registration of virtual and real objects. The drawing either may be captured by the augmented reality application in real-time or may be recorded and uploaded into the augmented reality application to be accessed at any time in the future time.

Next, as shown in block 204, the process flow includes initiating a first machine learning model on the drawing. Once the drawing is captured using the augmented reality application, the system may be configured to determine, from the drawing, that the user is attempting to draw a database model. A database model represents the logical structure of a database, including the relationships and constraints that determine how data can be stored and accessed. For purposes of this invention, the database model used to describe intelligent modelling is the entity-relationship (ER) model. Those skilled in the art will appreciate that the embodiments described herein may be applicable to any other database model without departing from the scope and spirit of the invention. The ER model describes interrelated things of interest in a specific domain of knowledge. An ER model may be depicted (drawn) in a graphical form as boxes (entities) that are connected by lines (relationships) which express the associations and dependencies between entities. Entities may also include additional properties (attributes). For example, an entity such as an employee may have an attribute such as employee identification number. The entity, employee, may have a supervisory relationship with an apprentice, another entity.

To determine whether the user is attempting to design/draw a database model, the system may be configured to use machine learning techniques. To this end, the system may be configured to train a first machine learning model to determine whether the user is attempting to draw a database model. As described herein, a machine learning model may refer to a mathematical model generated by machine learning algorithms based on sample data, known as training data, to make predictions or decisions without being explicitly programmed to do so. By initiating the machine learning algorithm on entities and attributes associated with existing (and approved) database models, the system may be configured to determine one or more classification parameters for the first machine learning model to predict the likelihood of any drawing being a database model with entities and attributes. Once the first machine learning model is trained, the system may be configured to initiate the first machine learning model on the drawing.

Next, as shown in block 206, the process flow includes determining, using the first machine learning model, that the user is attempting to design a database model. In some embodiments, the system may be configured to establish a threshold for the classification. If the likelihood of the drawing being a database model is greater than the threshold, the system may be configured to determine that the user is indeed attempting to design the database model. On the other hand, if the likelihood of the drawing being a database model is lower than the threshold, the system may be configured to determine that the user is not attempting to design the database model. In cases where the augmented reality application is capturing the drawing in real-time, the system may be configured to periodically run the first machine learning model on the drawing, as the user continues to develop the drawing. At each periodic interval, the system may be configured to compare the output of the first machine learning model, i.e., likelihood of the drawing being a database model, to the threshold. When the likelihood is greater than the threshold, the system may be configured to determine that the user is attempting to design the database model.

Next, as shown in block 208, the process flow includes extracting at least a first entity from the drawing based on at least determining that the user is attempting the design the database model. As described herein, an entity may refer to an object in the real word with either a physical (e.g., employee) existence or a conceptual (e.g., job posting) existence. Here, the system may be configured to extract any object depicted by the user in the drawing as an entity.

Next, as shown in block 210, the process flow includes determining, using the first machine learning model, one or more attributes for the first entity. Each entity may be described by a set of attributes. For example, an entity such as employee may be described by attributes such as name, address, salary, date of birth, or the like. Each attribute has a name and is associated with an entity and a data source from which it retrieves values. In some embodiments, each attribute may be associated with an attribute type depending on the nature of the attributes. Simple attributes are those drawn from data sources that contain atomic values, i.e., strings, integers, decimals, dates that cannot be further subdivided. Examples of simple attributes include name, date of birth, or the like. On the other hand, composite attributes are those drawn from data sources that contain a hierarchy of attributes. Examples of composite attributes include address, that may consist of a number, street, suburb, or the like. Based on the entity extracted from the drawing, the system may be configured to determine any applicable attributes that may be associated with the entity using the first machine learning model.

Next, as shown in block 212, the process flow includes initiating, via the augmented reality application, a first push notification for display on the computing device of the user, wherein the first push notification comprises at least the one or more attributes. In some embodiments, the system may be configured to determine entities that may be related to the first entity, and any associated attributes related to those entities. Once identified, the system may be configured to display the list of relevant entities and attributes for user approval.

Next, as shown in block 214, the process flow includes electronically receiving, via the augmented reality application, a user selection of a subset of attributes from the one or more attributes. In some embodiments, in addition to selecting the subset of attributes, the user may also select any related entity from the list of relevant entities presented to the user. As the user selects each attribute (or related entity), the system may be configured to automatically populate the drawing captured by the augmented reality application with the selected attributes and entities. In some embodiments, the system may be configured to automatically generate, using the first machine learning model, a relationship between the first entity and the subset of attributes selected by the user. Similarly, the system may be configured to automatically generate a relationship between the first entity and any related entity selected by the user. These relationships are recorded in the conceptual database model.

Next, as shown in block 216, the process flow includes generating, using the augmented reality application, a conceptual database model based on at least the first entity and the subset of attributes. Once the conceptual database model is generated, the system may be configured to determine, using the first machine learning model, one or more applicable database schema defining the blueprint of how the user wishes to construct the database. Database schema describes both the organization of data and the relationships between tables in a given database. In response, the system may be configured to initiate, via the augmented reality application, a second push notification to communicate the applicable database schema to the user on the computing device of the user. The user may then select a database schema from the list of schemas presented. Based on the user selection of a database schema, the system may be configured to generate a physical database model by converting the entities into tables, relationships in to foreign keys, and attributes into columns based on the physical constraints/requirements of the database schema selected by the user. Accordingly, the physical database model may show all the table structures, including column name, column data type, column constraints, primary key, foreign key, and relationships between tables. Once the physical database model is selected, the system may be configured to automatically generate an entity relationship diagram (ERD) based on the physical database model illustrating a logical structure of the database model.

FIG. 3 illustrates a conceptual database model generated by the augmented reality application 300, in accordance with an embodiment of the invention. As shown in FIG. 3, the conceptual database model 300 may include ENTITY 1 302, ENTITY 2 308, and ENTITY 3 314 that may refer to an object in the real word, RELATIONSHIP 1 306 that expresses the associations and dependencies between ENTITY 1 302 and ENTITY 2 308, RELATIONSHIP 2 316 that expresses the associations and dependencies between ENTITY 1 302 and ENTITY 3 314, and RELATIONSHIP 3 312 that expresses the associations and dependencies between ENTITY 2 308 and ENTITY 3 314. Each entity may be associated with a number of attributes. As shown, ENTITY 1 302 may be associated with attributes ATTRIBUTE 1.1, ATTRIBUTE 1.2, and ATTRIBUTE 1.3 304, ENTITY 2 308 may be associated with attributes ATTRIBUTE 2.1, ATTRIBUTE 2.2, and ATTRIBUTE 2.3 310, and ENTITY 3 314 may be associated with attributes ATTRIBUTE 3.1, ATTRIBUTE 3.2, and ATTRIBUTE 3.3 320.

As described herein, in an example embodiment, the system may be configured to extract ENTITY 1 302, RELATIONSHIP 1 306, and ENTITY 2 308 from the drawing made by the user using the augmented reality application. In response, the system may be configured to determine, using the first machine learning model, attributes associated with ENTITY 1 302 and ENTITY 2 308, and suggest the all associated attributes to the user. Then, the system may be configured to receive a user selection of ATTRIBUTE 1.1, ATTRIBUTE 1.2, and ATTRIBUTE 1.3 304 for ENTITY 1 302, and ATTRIBUTE 2.1, ATTRIBUTE 2.2, and ATTRIBUTE 2.3 310 for ENTITY 2 308 to the user. These attributes are then automatically included into the conceptual database model.

FIG. 4 illustrates determination of attributes based on extracted entities using a machine learning model 400, in accordance with an embodiment of the invention. As shown in FIG. 4, in one example, assume that the entity extracted from the drawing is employee 402. In response, the first machine learning model 404 may display, on the computing device of the user, suggested attributes 406 that include employee id, first name, last name, address, phone number, and designation. In another example, assume the entity extracted from the drawing is salary 408. In response, the first machine learning model 404 may display, on the computing device of the user, suggested attributes 412 that include employee id, first name, last name, department, annual compensation, and applicable bonus. Once the user selections are received, and the conceptual model is approved by the user, the system may be configured to generate the physical database model.

Before creating the database using the physical database model, the physical database model may require data source approval. Typically, when a database is created, the tables and columns of the database are populated by data received from various data sources. It is not uncommon for some, if not all, data sources to be associated with sensitive information in some capacity. Access to such sensitive information typically requires authorization. The present invention leverages the benefits of distributed ledger technology to allow users to obtain data source authorization prior to the creation of the database. To this end, the present invention includes a machine learning model that identifies specific data sources that are likely to be triggered by the creation of the database.

The system of the present invention leverages distributed ledger technology and machine learning techniques to approve implementation of the database model. Once the database model has been developed, the machine learning model may be able to identify data sources (e.g., other databases with entities/attributes that may be affected) should the database go live. This relationship may be based on nature of the data (e.g., data sensitivity), access requirements of the data, source of the data, etc. In addition, the layered machine learning model identifies the database administrators associated with each related database. These administrators are used as validators in the distributed ledger. The database model (logical/physical model) is then broadcasted, using the distributed ledger technology to all the database administrators for approval/validation. As part of this approval/validation process, the layered machine learning model, in addition to identifying the related databases, also predicts any entities/attributes that may be affected in each related database by the entities/attributes in the database model. Therefore, the broadcast will not only include the entity-relationship (ER) diagram of the database model, but also a map of entities/attributes that could be affected by the implementation of the database model. Once approved and verified by the validators, the database model can be implemented.

FIG. 5 illustrates a process flow for authorizing a database model using distributed ledger technology 500, in accordance with an embodiment of the invention. As shown in block 502, the process flow includes receiving, from a computing device of a user, a physical database model. As described herein, the physical database model may include all the necessary information required to create the database, such as column name, column data type, column constraints, primary key, foreign key, and relationships between tables.

Next, as shown in block 504, the process flow includes determining one or more data sources. A data source may refer to a location where data that is being used is obtained. Databases may have multiple data sources defined, depending on their purpose or function. Data sources may be databases that are located in a disk or a remote server, files, data sheets, spreadsheets, and XML file, hard-coded data within various applications, and/or the like.

Next, as shown in block 506, the process flow includes initiating a second machine learning model on the one or more data sources and the physical database model. As described herein, a machine learning model may refer to a mathematical model generated by machine learning algorithms based on sample data, known as training data, to make predictions or decisions without being explicitly programmed to do so. By initiating the machine learning algorithm on existing (and approved) database models and the data sources that are triggered by these database models, the system may be configured to determine one or more classification parameters for the second machine learning model to determine data sources that are likely to be triggered by when populating the database created using the physical database model. In some embodiments, the system may be configured to determine, using the second machine learning model, specific entities, attributes, and/or relationships in the physical database model that are likely to trigger the data sources.

Next, as shown in block 508, the process flow includes determining, using the second machine learning model, at least one data source that is likely to be triggered when populating a database created using the physical database model. In this regard, the system may be configured to determine, using the classification parameters, the data sources that are likely to be triggered when populating a database created using the physical database model. In response to determining the data sources that are likely to be triggered, the system may be configured to determine whether the user has the requisite authorization to access the data sources. To this end, the system may be configured to determine an authorization requirement associated with the data sources that are likely to be triggered. Next, the system may be configured to determine an authentication level of the user. Once the authorization requirement of the data sources that are likely to be triggered and the authentication level of the user are determined, the system may be configured to determine whether the authentication level of the user meets the authorization requirement of the data sources that are likely to be triggered. If the authentication level of the user meets the authorization requirement of the data sources that are likely to be triggered, then no additional action is required, and the database can be created. In cases where the authentication level of the user does not meet the authorization requirement of the data sources that are likely to be triggered, the system may be configured to initiate the approval process using distributed ledger technology.

Next, as shown in block 510, the process flow includes generating a new transaction object for the physical database model. Distributed ledger (e.g., blockchain) may refer to database that is consensually shared and synchronized across multiple sites, institutions, or geographies, accessible by multiple people. Accordingly, a distributed ledger typically includes several nodes, which may be one or more systems, machines, computers, databases, data stores or the like operably connected with one another. In some cases, each of the nodes or multiple nodes are maintained by different entities. A distributed ledger typically works without a central repository or single administrator. The data records may be recorded in the distributed ledger as transaction objects. Here, a transaction object may include the physical database model for approval, a nonce-a randomly generated 32-bit whole number when the transaction object is created, and a hash value wedded to that nonce. Once generated, the physical database model is considered signed and forever tied to its nonce and hash.

Next, as shown in block 512, the process flow includes broadcasting the new transaction object for the physical database model to the at least one data source in a distributed ledger for validation. In some embodiments, when new transaction object is broadcast on the distributed ledger, a distributed ledger address is generated for that new transaction object, i.e., an indication of where it is located on the distributed ledger. This distributed ledger address is captured for recording purposes.

Next, as shown in block 514, the process flow includes receiving, from a computing device associated with the at least one data source, a validation of the physical database model. In this regard, each data source that is likely to be triggered may validate the physical database model in the transaction object, add the validated transaction object on the distributed ledger, and broadcast the validated transaction object (including an indication that the transaction object has been validated) to other data sources that are likely to be triggered. In some embodiments, receiving the validation of the physical database model may include receiving authorization to populate the database with data from the data source.

Next, as shown in block 516, the process flow includes authorizing a generation of a database using the physical database model based on at least receiving the validation. Once all the data sources that are likely to be triggered have provided authorization to populate the database with data from each data source, the system may be configured to authorize the generation of the database using the physical database model.

FIG. 6 illustrates a decentralized block chain network configuration, in accordance with an embodiment of the invention. As mentioned above, and referring to FIG. 6, a distributed ledger platform 600 is decentralized-meaning that a distributed ledger 620 (i.e., a decentralized ledger) is maintained on multiple nodes 610 of the distributed ledger platform 600. One node (e.g., data source triggered by the creation of the database) in the distributed ledger platform 600 may have a complete or partial copy of the distributed ledger. Data records (e.g., approval requests) are initiated at a node and communicated to the various nodes (e.g., data source triggered by the creation of the database) of the distributed ledger. Any of the nodes can approve a data record, add the data record to its copy of the distributed ledger, and/or broadcast the data record, its validation (in the form of a transaction object) and/or other data to other nodes.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. Pat. No. | Title | Filed On |
|---|---|---|
| US11,822,524B2 | SYSTEM FOR AUTHORIZING A DATABASE MODEL USING DISTRIBUTED LEDGER TECHNOLOGY | Sep. 23, 2021 |

What is claimed is:

1. A system for intelligent database modelling, the system comprising:
   at least one non-transitory storage device; and
   at least one processing device coupled to the at least one non-transitory storage device, wherein the at least one processing device is configured to:
   provide an augmented reality application for installation on a computing device of a user;
   capture, using the augmented reality application, a drawing made by the user on a medium;
   periodically initiate a first machine learning model on the drawing until the first machine learning model determines that the user is beginning to design a database model;
   determine, using the first machine learning model, that the user is beginning to design the database model;
   enhance, using the augmented reality the drawing using computer-generated perceptual information;
   extract at least a first entity from the enhanced drawing based on at least determining that the user is beginning to the design the database model, wherein the first entity comprises an employee;
   determine, using the first machine learning model, one or more attributes for the first entity, wherein each attribute is associated with a name and a data source for a value associated therewith, wherein, in an instance in which the first entity is an employee, the one or more attributes comprises at least employee information;
   initiate, via the augmented reality application, a first push notification for display on the computing device of the user, wherein the first push notification comprises at least the one or more attributes;
   electronically receive, via the augmented reality application, a user selection of a subset of attributes from the one or more attributes;
   generate, using the augmented reality application, a conceptual database model based on at least the first entity and the subset of attributes;
   automatically generate, using the first machine learning model, a relationship between the first entity and the subset of attributes;
   record the relationship in the conceptual database model;
   determine, using the first machine learning model, one or more database schema based on at least the conceptual database model;
   initiate, via the augmented reality application, a second push notification for display on the computing device of the user, wherein the second push notification comprises at least the one or more database schema;
   electronically receive, via the augmented reality application, a user selection of a database schema from the one or more database schema;
   in response, generate a physical database model using the database schema, wherein generating further comprises converting each entity into corresponding tables, each relationship into corresponding foreign keys, and the subset of attributes into corresponding columns based on physical constraints and requirements of the database schema selected by the user; and
   automatically generate an entity relationship diagram (ERD) based on the physical database model illustrating a logical structure of the database model.

2. The system of claim 1, wherein the at least one processing device is further configured to:
   retrieve one or more database models from a data repository;
   extract one or more entities and one or more attributes from the one or more database models;
   initiate a machine learning algorithm on one or more database models, and the one or more entities and the one or more attributes; and
   train, using the machine learning algorithm, the first machine learning model, wherein training further comprises determining one or more classification parameters for the first machine learning model.

3. The system of claim 2, wherein the at least one processing device is further configured to:

determine, using the classification parameters, the one or more attributes for the first entity.

4. The system of claim 1, wherein the at least one processing device is further configured to:
automatically generate, using the first machine learning model, a relationship between the first entity and the subset of attributes; and
record the relationship in the conceptual database model.

5. The system of claim 4, wherein the at least one processing device is further configured to:
transmit control signals configured to cause the computing device of the user to display the conceptual database model for user approval; and
electronically receive, via the computing device of the user, the user approval for the conceptual database model.

6. The system of claim 1, wherein the at least one processing device is further configured to:
initiate a second machine learning model on one or more data sources and the physical database model; and
determine, using the second machine learning model, at least one data source that is likely to be triggered when populating a database created using the physical database model.

7. The system of claim 1, wherein broadcasting the new transaction object further comprises:
receive, from a computing device associated with the at least one data source, an indication validating the physical database model; and
authorize a generation of a database using the physical database model based on at least receiving the validation.

8. A computer program product for intelligent database modelling, the computer program product comprising a non-transitory computer-readable medium comprising code causing a first apparatus to:
provide an augmented reality application for installation on a computing device of a user;
capture, using the augmented reality application, a drawing made by the user on a medium;
periodically initiate a first machine learning model on the drawing until the first machine learning model determines that the user is beginning to design a database model;
determine, using the first machine learning model, that the user is beginning to design the database model;
enhance, using the augmented reality the drawing using computer-generated perceptual information;
extract at least a first entity from the enhanced drawing based on at least determining that the user is beginning to the design the database model, wherein the first entity comprises an employee;
determine, using the first machine learning model, one or more attributes for the first entity, wherein each attribute is associated with a name and a data source for a value associated therewith, wherein, in an instance in which the first entity is an employee, the one or more attributes comprises at least employee information;
initiate, via the augmented reality application, a first push notification for display on the computing device of the user, wherein the first push notification comprises at least the one or more attributes;
electronically receive, via the augmented reality application, a user selection of a subset of attributes from the one or more attributes;
generate, using the augmented reality application, a conceptual database model based on at least the first entity and the subset of attributes;
automatically generate, using the first machine learning model, a relationship between the first entity and the subset of attributes;
record the relationship in the conceptual database model;
determine, using the first machine learning model, one or more database schema based on at least the conceptual database model;
initiate, via the augmented reality application, a second push notification for display on the computing device of the user, wherein the second push notification comprises at least the one or more database schema;
electronically receive, via the augmented reality application, a user selection of a database schema from the one or more database schema;
in response, generate a physical database model using the database schema, wherein generating further comprises converting each entity into corresponding tables, each relationship into corresponding foreign keys, and the subset of attributes into corresponding columns based on physical constraints and requirements of the database schema selected by the user; and
automatically generate an entity relationship diagram (ERD) based on the physical database model illustrating a logical structure of the database model.

9. The computer program product of claim 8, wherein the first apparatus is further configured to:
retrieve one or more database models from a data repository;
extract one or more entities and one or more attributes from the one or more database models;
initiate a machine learning algorithm on one or more database models, and the one or more entities and the one or more attributes; and
train, using the machine learning algorithm, the first machine learning model, wherein training further comprises determining one or more classification parameters for the first machine learning model.

10. The computer program product of claim 9, wherein the first apparatus is further configured to:
determine, using the classification parameters, the one or more attributes for the first entity.

11. The computer program product of claim 8, wherein the first apparatus is further configured to:
automatically generate, using the first machine learning model, a relationship between the first entity and the subset of attributes; and
record the relationship in the conceptual database model.

12. The computer program product of claim 11, wherein the first apparatus is further configured to:
transmit control signals configured to cause the computing device of the user to display the conceptual database model for user approval; and
electronically receive, via the computing device of the user, the user approval for the conceptual database model.

13. The computer program product of claim 8, wherein the first apparatus is further configured to:
initiate a second machine learning model on the one or more data sources and the physical database model; and
determine, using the second machine learning model, at least one data source that is likely to be triggered when populating a database created using the physical database model.

14. A method for intelligent database modelling, the method comprising:
  providing an augmented reality application for installation on a computing device of a user;
  capturing, using the augmented reality application, a drawing made by the user on a medium;
  periodically initiating a first machine learning model on the drawing until the first machine learning model determines that the user is beginning to design a database model;
  determining, using the first machine learning model, that the user is beginning to design the database model;
  enhancing, using the augmented reality the drawing using computer-generated perceptual information;
  extracting at least a first entity from the enhanced drawing based on at least determining that the user is beginning to the design the database model, wherein the first entity comprises an employee;
  determining, using the first machine learning model, one or more attributes for the first entity, wherein each attribute is associated with a name and a data source for a value associated therewith, wherein, in an instance in which the first entity is an employee, the one or more attributes comprises at least employee information;
  initiating, via the augmented reality application, a first push notification for display on the computing device of the user, wherein the first push notification comprises at least the one or more attributes;
  electronically receiving, via the augmented reality application, a user selection of a subset of attributes from the one or more attributes;
  generating, using the augmented reality application, a conceptual database model based on at least the first entity and the subset of attributes;
  automatically generating, using the first machine learning model, a relationship between the first entity and the subset of attributes;
  recording the relationship in the conceptual database model;
  determining, using the first machine learning model, one or more database schema based on at least the conceptual database model;
  initiating, via the augmented reality application, a second push notification for display on the computing device of the user, wherein the second push notification comprises at least the one or more database schema;
  electronically receiving, via the augmented reality application, a user selection of a database schema from the one or more database schema;
  in response, generating a physical database model using the database schema, wherein generating further comprises converting each entity into corresponding tables, each relationship into corresponding foreign keys, and the subset of attributes into corresponding columns based on physical constraints and requirements of the database schema selected by the user; and
  automatically generating an entity relationship diagram (ERD) based on the physical database model illustrating a logical structure of the database model.

* * * * *